March 26, 1935.  C. E. LEWIS  1,995,430
HUMIDITY REGULATOR
Original Filed March 3, 1930   2 Sheets-Sheet 1
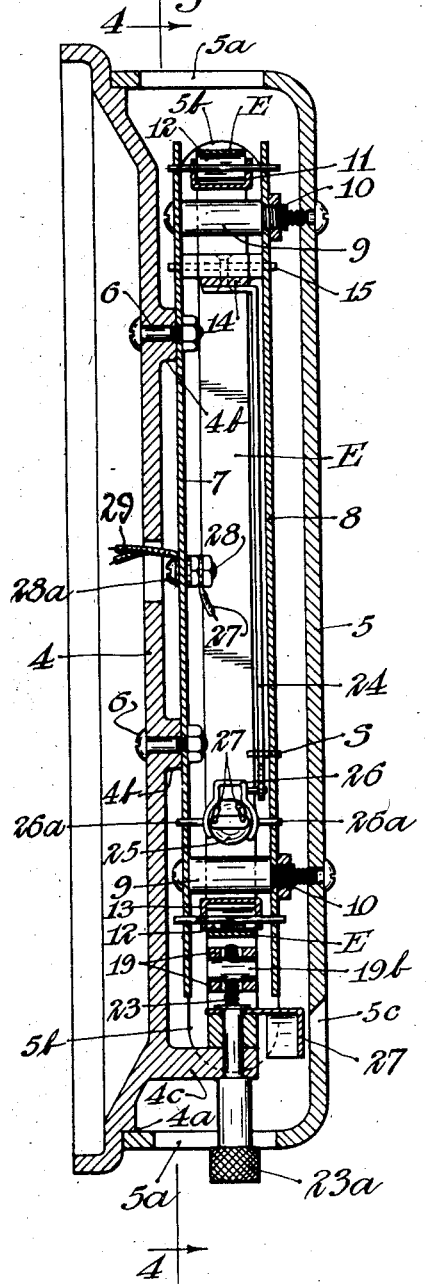
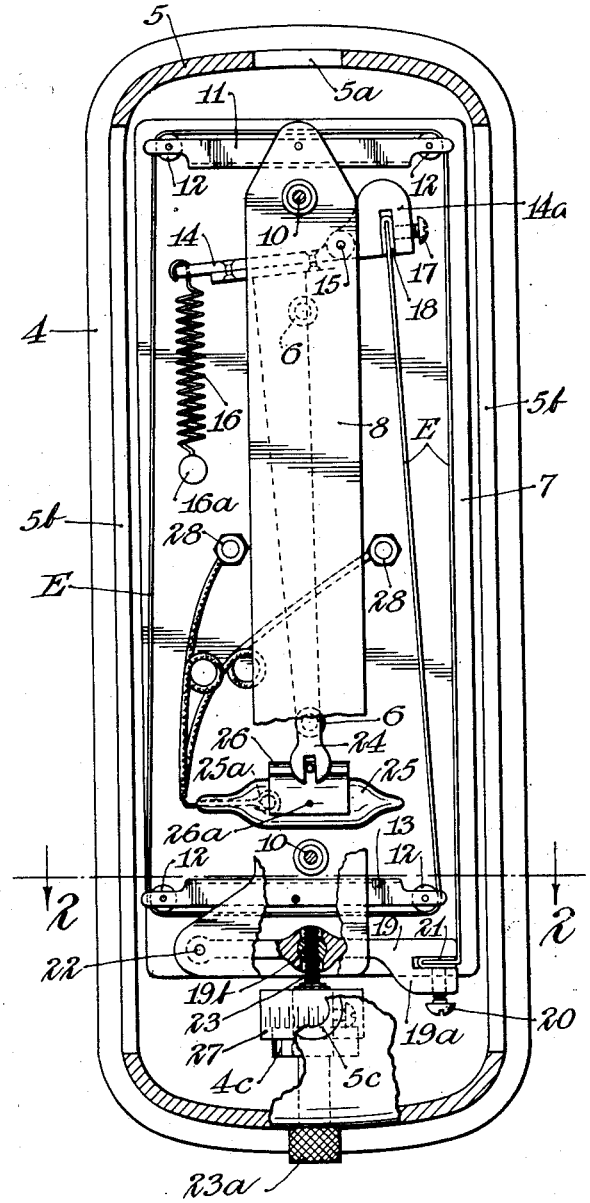
Inventor
Carroll E. Lewis
By his Attorneys
Williamson & Williamson March 26, 1935.  C. E. LEWIS  1,995,430
HUMIDITY REGULATOR
Original Filed March 3, 1930  2 Sheets-Sheet 2
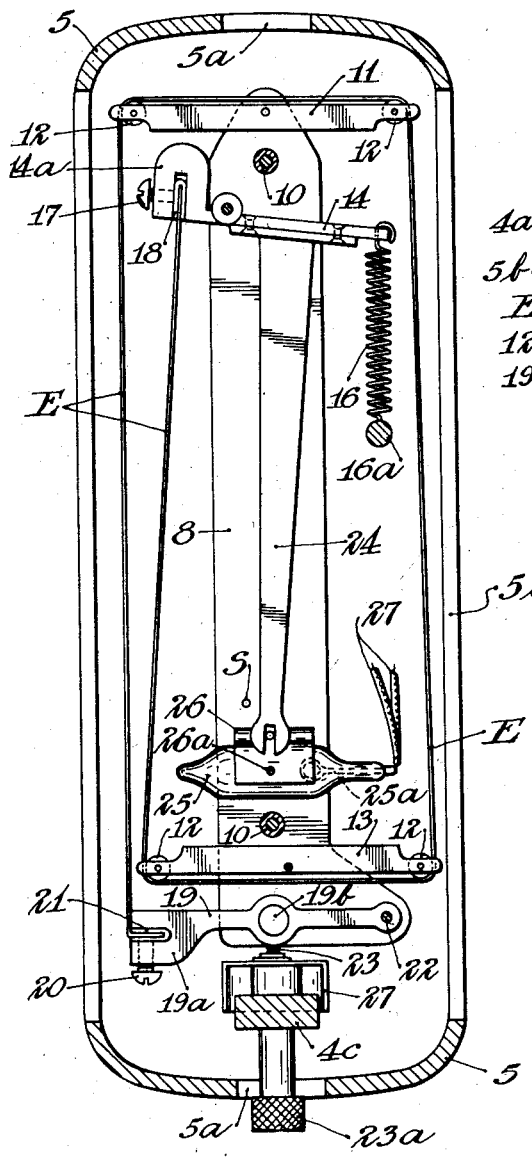
Inventor
Carroll E. Lewis
By his Attorneys
Williamson & Williamson Patented Mar. 26, 1935

1,995,430

UNITED STATES PATENT OFFICE 1,995,430

HUMIDITY REGULATOR

Carroll E. Lewis, St. Paul, Minn., assignor to Lewis Air Conditioners, Inc., Minneapolis, Minn., a corporation of Delaware Original application March 3, 1930, Serial No. 432,932, now Patent No. 1,968,301, July 31, 1934. Divided and this application October 30, 1931, Serial No. 571,987

3 Claims. (Cl. 200—52)

This application is a division of applicant's application entitled "Humidity regulator", S. N. 432,932, filed March 3rd, 1930, Patent 1,968,301, dated July 31, 1934.

My present invention relates to humidity controlling or regulating devices and more particularly to a combination of an expansive hygroscopic element and an oscillatory type of electrical switch which will control a circuit for a humidifying or dehumidifying system.

Heretofore to my knowledge it has been practically impossible to swing an oscillatory type of switch for operating a controlling circuit in response to small moisture variations.

It is an object of my present invention to provide simple, efficient and highly sensitive or responsive humidity controlling mechanism for accurately operating an electrical circuit in accordance with predetermined and small variations in the moisture content of the medium to which the mechanism is subjected.

More specifically it is an object of my invention to provide a humidity control mechanism which will accurately effect the oscillation of a switch of the mercury tube type upon very small moisture variations and which will function accurately after long continuous use.

These and other objects and advantages of the invention will be more fully set forth in the following description made in connection with the accompanying drawings, in which like reference characters refer to similar parts throughout the several views, and in which:—

Fig. 1 is a vertical section taken through the casing of an embodiment of my invention showing most of the working mechanism of the device in plan;

Fig. 2 is a horizontal cross section taken on the line 2—2 of Fig. 1;

Fig. 3 is a vertical section taken on the line 3—3 of Fig. 2; and

Fig. 4 is a vertical section taken approximately on the line 4—4 of Fig. 3 and showing the working mechanism in rear plan.

The embodiment of my invention illustrated in the drawings is mounted on a suitable shell base 4, as shown, of oblong shape having a rectangular flange or shoulder 4a about which a protective casing 5 is detachably fitted. Casing 5 may be provided at its upper and lower ends with apertures 5a and at its longitudinal sides with elongated slots or apertures 5b to permit the free circulation of air through the interior of the casing.

As shown, the working parts of my device are assembled in the form of a unit, which is detachably secured to the shell base 4 by means of bolts 6 and spaced from said base by a pair of outwardly projecting bosses 4b, as shown, integrally formed with the base. It will, of course, be obvious that the several working parts of my device may be directly connected with the base if so desired. My said control unit may include a rectangular backing plate 7 and a relatively narrow front plate 8 spaced from plate 7 in any suitable manner, such as by a pair of spacing sleeves 9 through which clamping bolts 10 extend securing the plates 7 and 8 together in the form of a frame. A substantially horizontal bracket 11 is mounted in the upper end of said frame between plates 7 and 8 and may comprise a channel member having notched or cut out end portions to afford forked extremities and a small roller 12 may be journaled in each of the forked ends positioned somewhat inwardly of the extremities in order that said extremities may cooperate therewith to form guides. A similar bracket 13 is mounted adjacent the lower end of the frame between plates 7 and 8 provided with suitable rollers 12. A relatively short actuating lever 14 is pivoted on a pin 15 between plates 7 and 8 and at a point below the upper guide bracket 11. Lever 14 extends transversely across my said unit frame and has its longer or left hand end connected with a contractile spring 16, which yieldingly impels the lever in one direction, spring 16 being anchored to backing plate 7 by a rivet 16a.

The shorter or right hand end of lever 14 is provided with a clamping head 14a which, as shown, has a deep receiving slot in the lower portion thereof and is provided with a set screw 17 adapted to cooperate with the slotted receiving portion.

My humidity responsive element E, in the form of an elongated thin flexible strip or ribbon, which is contractible and expansible with variations in the degree of humidity to which it is subjected, is secured at one end to clamping head 14a, usually provided at said end with a small clip 18, which snugly fits the receiving slot of the clamping head. Element E may be constructed from a number of different materials having moisture absorptive qualities and also having the characteristic of readily throwing off moisture absorbed, but I prefer to utilize a thin highly flexible ribbon constructed of moisture absorptive paper or other synthetically formed material. Strong paper ribbon having a high rag content and containing wood fibre and cellulose has been found highly satisfactory for my purpose. The device has also demonstrated efficiency with flexible strips or ribbon constructed from woven textile material, silk floss and human hair. The strip or element E extends downwardly from clamping head 14a and is trained about the rollers 12 of bracket 13 and about the rollers of bracket 11, the forked extremities of brackets 11 and 13 assisting in guiding the strip or element and preventing lateral displacement thereof from the guide rollers. The opposite end of element E extends downwardly from the right hand end of bracket 11 and is clamped in a suitable clamping head 19a of a relatively fixed anchoring member 19. Clamping head 19 may be formed similar to the clamping head 14a of lever 14 having a set screw 20 adapted to react against a clip 21 on the said engaged end of element E.

It will be seen that my humidity responsive element is compactly arranged within casing 5 in coil formation and thus a relatively long element may be used in a small device having relatively large longitudinal variation with changes in the humidity of the air to which it is subjected.

The anchoring member 19 is provided with fine adjustment of micrometer type and to this end, is pivoted at its left hand extremity by means of a pivot member 22 between plates 7 and 8, forming a lever of the second order. The intermediate portion of the anchoring member 19 carries a ball or other element 19b which is threadedly engaged by a short vertical adjusting worm 23, which may be journaled in a suitable bearing-provided lug 4c projecting outwardly from the lower end of the base 4 and, if desired, formed integrally therewith. Worm 23, as shown, is provided at its lower end with a knurled handle or knob 23a which projects through the lower aperture 5a in casing 5 for convenient manipulation. The adjusting worm may rigidly carry an indicator segment 27 having graduations or other indicia on the exterior surface thereof, which may be viewed through a small sight opening 5c formed in the lower portion of the face of casing 5.

An elongated depending arm 24 is rigidly fixed to the longer arm of lever 14, extends longitudinally of the control unit and between plates 7 and 8, this arm with lever 14 forming a bell crank lever and greatly multiplying, at its outer end, the movement of the shorter end of lever 14. Below the outer end of elongated arm 24, an oscillatory mercury tube switch is mounted, of the type comprising a sealed glass capsule 25 having therein a small quantity of mercury and provided with a pair of insulated electrical contacts 25a projecting some distance into the interior of the capsule and electrically connected by the mercury when the tube is oscillated to a predetermined position. A clip 26 is secured to the medial portion of the tube 25, and this clip is pivoted by means of pins or trunnions 26a between the plates 7 and 8. The outer end of elongated arm 24 is suitably connected with the clip 26 at a point eccentric of the pivot in the mercury tube. This connection may be in the form shown consisting of a slotted pin connection. The contacts 25a are connected by short flexible wires 27 with a pair of binding posts 28 extended through plate 7 and having terminals 28a at the rear of plate 7 to which suitable electric service wires 29 may be secured, said service wires passing through a suitable aperture in the shell base 4, the concavo-convex shape of the base serving to house and conceal any additional length of service wires required.

When the ribbon or hygroscopic element E is subjected to abnormal humidity at relatively high temperatures its strength is of course considerably weakened by the absorption of moisture and to relieve the tension upon said ribbon when a predetermined humidity has been attained I provide a stop S, as shown, mounted in plate 8 and projected inwardly therefrom in the path of a greatly elongated switch operating arm 24. Said stop S limits the movement of arm 24 when urged by spring 16, to relieve subsequent tension of the spring upon the strip or ribbon E after a predetermined movement of the arm has been obtained through expansion and moisture absorption of element E.

In most humidifying systems a humidifier is provided to supply moisture to the air, and where humidity control is used a magnetically controlled valve, or other electrically operated mechanism is usually furnished for controlling the supply of moisture to the humidifier. My humidity regulator is, of course, adapted to be utilized for controlling the electrical circuit for opening and closing the valve, or for controlling the device for supplying moisture to the humidifier.

In systems for dehumidifying air the position of the oscillatory switch 25 is usually reversed and controls a circuit for operating the refrigerating coil or other dehumidifying means.

Operation

The operation of my improved device may be briefly described as follows:—

The worm of screw 23 is first adjusted so that the tension of the spring 16 will be balanced by the tension of the element or strip E to cause the mercury tube 25 to be maintained substantially in the position shown in the drawings, when the humidity of the air is at a predetermined percentage. In this position, the contacts of the mercury tube are not covered with mercury and the circuit is open.

A decrease in the humidity of the air to which element E is subjected will cause element E to contract longitudinally, pulling the shorter arm of lever 14 downwardly against the tension of spring 16, and thereby causing the elongated arm 24 of bell crank lever to swing to the left. This swinging movement oscillates mercury tube 25, swinging the left end of said tube downwardly and thereby causing the mercury to run to that end, covering the contacts and closing the circuit.

When the humidity of the air exceeds a predetermined percentage, element E will be expanded a sufficient distance to permit contractual spring 16 to swing lever 14 sufficiently to return the oscillatory tube 25 to a position where the contacts 25a will not be electrically connected by the mercury.

It will be noticed that while the anchoring element 19 is a relatively fixed element, its position can be very finely adjusted by means of worm 23, thus varying the tension upon strip or element E, as well as the position of switch 25, thereby adjusting the mechanism for various humidities desired, within, of course, certain limits.

It will further be seen that a very slight movement of the short end of actuating lever 14 produces a relatively larger movement on the lower or outer end of the arm 24 which is connected with the mercury tube. This, coupled with the fact that a relatively long flexible humidity responsive element, is utilized with my structure, producing a device which is very quickly responsive to slight variations in the humidity of the air to which it is subjected.

The construction of my elongated expansive hygroscopic element E, in the form of a thin ribbon, preferably constructed synthetically and the movement of said thin ribbon in such manner that it is efficiently subjected to the moisture of the air surrounding the device are important factors in the very quick response of the mechanism to slight variations in the humidity of the air. The working parts and connections are such that there is practically no slack or play in the mechanism and the balancing of the coiled spring or tensioning means against the flexible strip prevents swinging of the oscillatory switch due to slight vibrations, while the relatively slight movements of actuating lever 14 are tremenduously multiplied to accurately effect the oscillation of the circuit controlling switch.

The mounting of the flexible humidity responsive element permits said element to expand or contract throughout its length with a minimum of friction, but it will, of course, be understood that any suitable guides may be used for tensioning and arranging the element E in substantially the manner illustrated.

The indicator mounted upon the worm 23 provides a convenient means for setting the device for predetermined humidity, the reading being taken through the small aperture 5c in the face of casing 5.

In utilizing my mechanism for controlling dehumidifying means the operation of the element E, actuating arm 14, elongated operating arm 24 and the oscillation of mercury tube switch 25 is as above described, but the switch may be reversed in order that the circuit may be opened rather than closed when the relative moisture content of the air has fallen below a predetermined percentage.

In actual practice I have found that my device, constructed in the manner illustrated, is responsive to variations of less than four per cent in the humidity of the air to such extent as to open and close the circuit.

It will, of course, be understood that various changes may be made in the form, details, arrangement and proportions of the parts without departing from the scope of my invention.

What is claimed is:—

1. In a control device responsive to variations in moisture, a support, actuated mechanism for multiplying movement mounted on said support, an oscillatory electrical switch mounted on said support and eccentrically connected with the movement multiplying end of said actuated mechanism, a set of guides mounted on said support and extending outwardly of said actuated mechanism and said switch, an elongated flat flexible ribbon extensible and contractible with variations in moisture wound about said guides in substantially annular form, substantially encircling said actuated mechanism, means for anchoring one end of said ribbon, the opposite end being connected to said actuated mechanism, said ribbon extending edgewise with reference to said support and thus efficiently exposed to the fluid medium surrounding the device.

2. In a control device responsive to variations in moisture, a support, an elongated flexible element expansible and contractable with variations in the humidity of the air to which it is subjected, a set of guides mounted on said support and arranged to hold said element in annular form, means for anchoring one end of said element, actuated mechanism mounted on said support adapted to multiply movement and connected with the opposite end of said element, means for constantly placing a slight tension upon said element, and an oscillatory type of electrical switch eccentrically connected with the movement multiplying end of said actuated mechanism, said actuated mechanism, said tensioning means and said oscillatory switch all being mounted within the confines of said annularly arranged element whereby the exterior of said element will be freely exposed to the air.

3. A compact circuit controlling device comprising a support, an electrical switch mounted on said support, mechanism for operating said switch in response to slight actuating impulses, and actuating means responsive to variations in moisture, said means comprising an elongated ribbon anchored at one end to said support and wound about said switch to substantially encompass the latter, the movable end of said ribbon being connected to said operating mechanism.

CARROLL E. LEWIS.